United States Patent
Wood et al.

(10) Patent No.: US 10,404,450 B2
(45) Date of Patent: Sep. 3, 2019

(54) SCHEMATIZED ACCESS CONTROL IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 15/144,530

(22) Filed: May 2, 2016

(65) Prior Publication Data
US 2017/0317821 A1    Nov. 2, 2017

(51) Int. Cl.
*H04L 9/08*        (2006.01)
*H04L 29/06*     (2006.01)

(52) U.S. Cl.
CPC ............ *H04L 9/0819* (2013.01); *H04L 9/083* (2013.01); *H04L 9/0847* (2013.01); *H04L 9/0861* (2013.01); *H04L 9/0891* (2013.01); *H04L 63/0428* (2013.01); *H04L 63/062* (2013.01);
(Continued)

(58) Field of Classification Search
CPC ... H04L 9/0819; H04L 63/068; H04L 63/062; H04L 63/0428; H04L 9/0861; H04L 9/083; H04L 9/0891; H04L 9/0847; H04L 2209/60
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Eleni A Shiferaw
*Assistant Examiner* — Cheng-Feng Huang

(57) ABSTRACT

A system performs a setup function which outputs a master secret key associated with a content producing device and public parameters. The system generates a secret key for a user in a content centric network (CCN) based on a master secret key associated with the content producing device, and a schema associated with the user. In response to an interest from the user that includes a name that matches the schema, the system encrypts a payload of a content object based on the name and the public parameters. The system transmits the content object to the user. The encrypted payload is configured such that it can only be decrypted by the secret key of the user and cannot be decrypted by the user if the name in the interest does not match the schema, thereby facilitating schematized access control to content objects in the CCN.

20 Claims, 7 Drawing Sheets

(52) U.S. Cl.
CPC ........ H04L 63/068 (2013.01); *H04L 2209/60* (2013.01)

(56) References Cited

U.S. PATENT DOCUMENTS

| | | | |
|---|---|---|---|
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,173,364 B1 | 1/2001 | Zenchelsky |
| 6,226,618 B1 | 5/2001 | Downs |
| 6,233,617 B1 | 5/2001 | Rothwein |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,071,498 B2 | 6/2015 | Beser |
| 9,112,895 B1 | 8/2015 | Lin |
| 9,280,610 B2 | 3/2016 | Gruber |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |

(56) References Cited

U.S. PATENT DOCUMENTS

| | | |
|---|---|---|
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0046718 A1* | 2/2008 | Grab ............ G06F 21/10 713/156 |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |

(56) References Cited

U.S. PATENT DOCUMENTS

| | | |
|---|---|---|
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219427 A1 | 9/2011 | Hito |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0166806 A1* | 6/2012 | Zhang .................. H04L 9/3247 713/176 |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0066823 A1 | 3/2013 | Sweeney |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |

(56) References Cited

U.S. PATENT DOCUMENTS

| | | | |
|---|---|---|---|
| 2014/0096249 | A1 | 4/2014 | Dupont |
| 2014/0108313 | A1 | 4/2014 | Heidasch |
| 2014/0108474 | A1 | 4/2014 | David |
| 2014/0115037 | A1 | 4/2014 | Liu |
| 2014/0122587 | A1 | 5/2014 | Petker et al. |
| 2014/0129736 | A1 | 5/2014 | Yu |
| 2014/0136814 | A1 | 5/2014 | Stark |
| 2014/0140348 | A1 | 5/2014 | Perlman |
| 2014/0143370 | A1 | 5/2014 | Vilenski |
| 2014/0146819 | A1 | 5/2014 | Bae |
| 2014/0149733 | A1 | 5/2014 | Kim |
| 2014/0156396 | A1 | 6/2014 | deKozan |
| 2014/0165207 | A1 | 6/2014 | Engel |
| 2014/0172783 | A1 | 6/2014 | Suzuki |
| 2014/0172981 | A1 | 6/2014 | Kim |
| 2014/0173034 | A1 | 6/2014 | Liu |
| 2014/0173076 | A1 | 6/2014 | Ravindran |
| 2014/0192717 | A1 | 7/2014 | Liu |
| 2014/0195328 | A1 | 7/2014 | Ferens |
| 2014/0195641 | A1 | 7/2014 | Wang |
| 2014/0195666 | A1 | 7/2014 | Dumitriu |
| 2014/0214942 | A1 | 7/2014 | Ozonat |
| 2014/0229732 | A1* | 8/2014 | Roth ............... G06F 21/602 713/167 |
| 2014/0233575 | A1 | 8/2014 | Xie |
| 2014/0237085 | A1 | 8/2014 | Park |
| 2014/0237095 | A1 | 8/2014 | Bevilacqua-Linn |
| 2014/0245359 | A1 | 8/2014 | DeFoy |
| 2014/0254595 | A1 | 9/2014 | Luo |
| 2014/0280823 | A1 | 9/2014 | Varvello |
| 2014/0281489 | A1 | 9/2014 | Peterka |
| 2014/0281505 | A1 | 9/2014 | Zhang |
| 2014/0282816 | A1 | 9/2014 | Xie |
| 2014/0289325 | A1 | 9/2014 | Solis |
| 2014/0289790 | A1 | 9/2014 | Wilson |
| 2014/0298248 | A1 | 10/2014 | Kang |
| 2014/0314093 | A1 | 10/2014 | You |
| 2014/0337276 | A1 | 11/2014 | Iordanov |
| 2014/0365550 | A1 | 12/2014 | Jang |
| 2015/0006896 | A1* | 1/2015 | Franck ............... H04L 63/04 713/171 |
| 2015/0018770 | A1 | 1/2015 | Baran |
| 2015/0032892 | A1 | 1/2015 | Narayanan |
| 2015/0039890 | A1 | 2/2015 | Khosravi |
| 2015/0063802 | A1 | 3/2015 | Bahadur |
| 2015/0089081 | A1 | 3/2015 | Thubert |
| 2015/0095481 | A1 | 4/2015 | Ohnishi |
| 2015/0095514 | A1 | 4/2015 | Yu |
| 2015/0169758 | A1 | 6/2015 | Assom |
| 2015/0188770 | A1 | 7/2015 | Naiksatam |
| 2015/0195149 | A1 | 7/2015 | Vasseur |
| 2015/0207633 | A1 | 7/2015 | Ravindran |
| 2015/0207864 | A1 | 7/2015 | Wilson |
| 2015/0279348 | A1 | 10/2015 | Cao |
| 2015/0372903 | A1 | 12/2015 | Hui |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

"PBC Library-Pairing-Based Cryptography-About," http://crypto.stanford.edu/pbc.downloaded Apr. 27, 2015.

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

Anteniese et al., "Improved Proxy Re-Encryption Schemes with Applications to Secure Distributed Storage", 2006.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digit.

Gopal et al. "Integrating content-based Mechanisms with hierarchical File systems", Feb. 1999, University of Arizona, 15 pages.

Detti et al., "Supporting the Web with an information centric network that routes by name", Aug. 2012, Computer Networks 56, pp. 3705-3702.

Hoque et al., 'NLSR: Named-data Link State Routing Protocol', Aug. 12, 2013, ICN 2013, pp. 15-20.

V. Jacobson et al., 'Networking Named Content,' Proc. IEEE CoNEXT '09, Dec. 2009.

L. Wang et al., 'OSPFN: An OSPF Based Routing Protocol for Named Data Networking,' Technical Report NDN-0003, 2012.

Merindol et al., "An efficient algorithm to enable path diversity in link state routing networks", Jan. 10, Computer Networks 55 (2011), pp. 1132-1140.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Garcia-Luna-Aceves et al., "Automatic Routing Using Multiple Prefix Labels", 2012, IEEE, Ad Hoc and Sensor Networking Symposium.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

C. Gentry and A. Silverberg. Hierarchical ID-Based Cryptography. Advances in Cryptology—ASIACRYPT 2002. Springer Berlin Heidelberg (2002).

Xiong et al., "CloudSeal: End-to-End Content Protection in Cloud-based Storage and Delivery Services", 2012.

Biradar et al., "Review of multicast routing mechanisms in mobile ad hoc networks", Aug. 16, Journal of Network and Computer Applications 35 (2012) 221-229.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

(56) References Cited

OTHER PUBLICATIONS

J. Shao and Z. Cao. CCA-Secure Proxy Re-Encryption without Pairings. Public Key Cryptography. Springer Lecture Notes in Computer Science vol. 5443 (2009).
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/.downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.

(56) References Cited

OTHER PUBLICATIONS

Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. MAJD, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.

(56) References Cited

OTHER PUBLICATIONS

Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Zahariadis, Theodore, et al. "Trust management in wireless sensor networks." European Transactions on Telecommunications 21.4 (2010): 386-395.
Mahadevan, Priya, et al. "Systematic topology analysis and generation using degree correlations." ACM SIGCOMM Computer Communication Review. vol. 36. No. 4. ACM, 2006.
https://code.google.com/p/ccnx-trace/.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
International Search Report and Written Opinion in counterpart International Application No. PCT/US2017/030426, dated Sep. 7, 2017, 11 pages.
Zhang, et al., "Towards Name-based Trust and Security for Content-centric Network," 19th IEEE International Conference on Network Protocols (ICNP), Oct. 2011, 6 pages.
Fotiou, et al., "Decentralized Name-based Security for Content Distribution using Blockchains," IEEE Conference on Computer Communications Workshops (INFOCOM WKSHPS), Apr. 2016, 6 pages.
Waters, "Functional Encryption for Regular Languages," CRYPTO 2012: Advances in Cryptology—CRYPTO 2012, Aug. 2012, 18 pages.
Appenzeller, et al., "Identity-Based Encryption Architecture and Supporting Data Structures," Network Working Group, Request for Comments: 5408, Jan. 2009, 30 pages.

\* cited by examiner

SCHEMATIZED ACCESS CONTROL IN A CONTENT CENTRIC NETWORK

RELATED APPLICATIONS

The subject matter of this application is related to the subject matter in the following applications:

- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814"); and
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

the disclosures of which are herein incorporated by reference in their entirety.

BACKGROUND

Field

This disclosure is generally related to distribution of digital content. More specifically, this disclosure is related to a method and system for providing an extension to CCN routing protocols that enables a consumer to generate routable prefix queries and determine the minimum number of cleartext name components necessary for an interest to reach a producer in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A producer can encrypt the payload of a content object and only distribute keys to authorized consumers. For example, the producer can generate a random symmetric nonce key "k" for a content object "C," encrypt the payload of C using k, and publish the encrypted content object C. The producer can also encrypt k under another key (so that only authorized users can perform decryption), and publish the encrypted nonce key. A consumer can request the content object C and the corresponding nonce key k, both of which are encrypted. The consumer may request or obtain additional information needed to decrypt the encrypted nonce key, based on the specific access control scheme. The consumer can then decrypt the encrypted nonce key using his private credentials (e.g., the additional information), and subsequently decrypt the encrypted payload of content object C using the decrypted nonce key. In such a hybrid encryption scheme, the producer must maintain the content object C (in both plaintext and encrypted form), the nonce key k in plaintext, and the nonce key k in encrypted form for each different access control group allowed to access the content object C. Additionally, the producer must also maintain authorization information that indicates which access control groups are permitted to access which content objects. This can result in system with decreased efficiency.

While a CCN brings many desired features to a network, some issues remain unsolved for a producer that encrypts content based on access control groups.

SUMMARY

One embodiment provides a system that facilitates schematized access control in a content centric network. During operation, the system generates, by a content producing device, a secret key for a user based on a schema, wherein the schema is a regular expression which corresponds to one or more names and allows a user access to content associated with the names, wherein a name is a hierarchically structured variable length identifier that includes contiguous name components ordered from a most general level to a most specific level. The system receives an interest with a name that corresponds to the schema. The system encrypts a payload of a responsive content object based on the interest name. The system transmits the responsive content object with the encrypted payload to the user, which allows the user to decrypt the encrypted payload with the secret key.

In some embodiments, the system performs a setup function which outputs a master secret key and public parameters, wherein generating the secret key is further based on the master secret key, and wherein encrypting the payload is further based on the public parameters.

In some embodiments, the system transmits the secret key to the user or a client computing device of the user.

In some embodiments, the system generates the responsive content object with the encrypted payload.

In some embodiments, generating the secret key is in response to one or more of the following: adding a new user to the system; changing a permission of a current user of the system; and determining a need to change the secret key, including a need to rotate one or more secret keys of current users of the system.

In some embodiments, performing the setup function, generating the secret key, and encrypting the payload of the responsive content object are based on a functional encryption system.

In some embodiments, the system delegates the generation of the secret key and the performance of the setup function to a trusted third party that is a key managing device, wherein the key managing device: performs the setup function which outputs the master secret key and the public parameters; generates the secret key for the user based on the schema; transmits the secret key to the user or a client computing device of the user; and transmits the public parameters to the content producing device.

One embodiment provides a system that facilitates schematized access control. During operation, the system receives, by a client computing device, a secret key for a user based on a schema, wherein the schema is a regular expression which corresponds to one or more names and allows a user to access content associated with the names, wherein a name is a hierarchically structured variable length identifier that includes contiguous name components ordered from a most general level to a most specific level. In response to an interest with a name, the system receives from a content producing device a responsive content object with an encrypted payload. In response to determining that the interest name corresponds to the schema, the system decrypts the payload based on the secret key, thereby facilitating schematized access control in a content centric network.

In some embodiments, in response to determining that the interest name does not correspond to the schema, the system obtains an indication that the decryption is unsuccessful.

In some embodiments, determining that the interest name corresponds to the schema is based on a functional encryption system.

In some embodiments, receiving the secret key is in response to transmitting a request for the secret key.

In some embodiments, the system transmits the request for the secret key to a key managing device that is a trusted third party of the content producing device, wherein the content producing device delegates generation of the secret key and performance of a setup function to the key managing device.

In some embodiments, the system receives the secret key from the key managing device.

In some embodiments, the system transmits the request for the secret key to the content producing device, and receives the secret key from the content producing device.

BRIEF DESCRIPTION OF THE FIGURES

In the figures, like reference numerals refer to the same figure elements.

DETAILED DESCRIPTION

Figure 1:
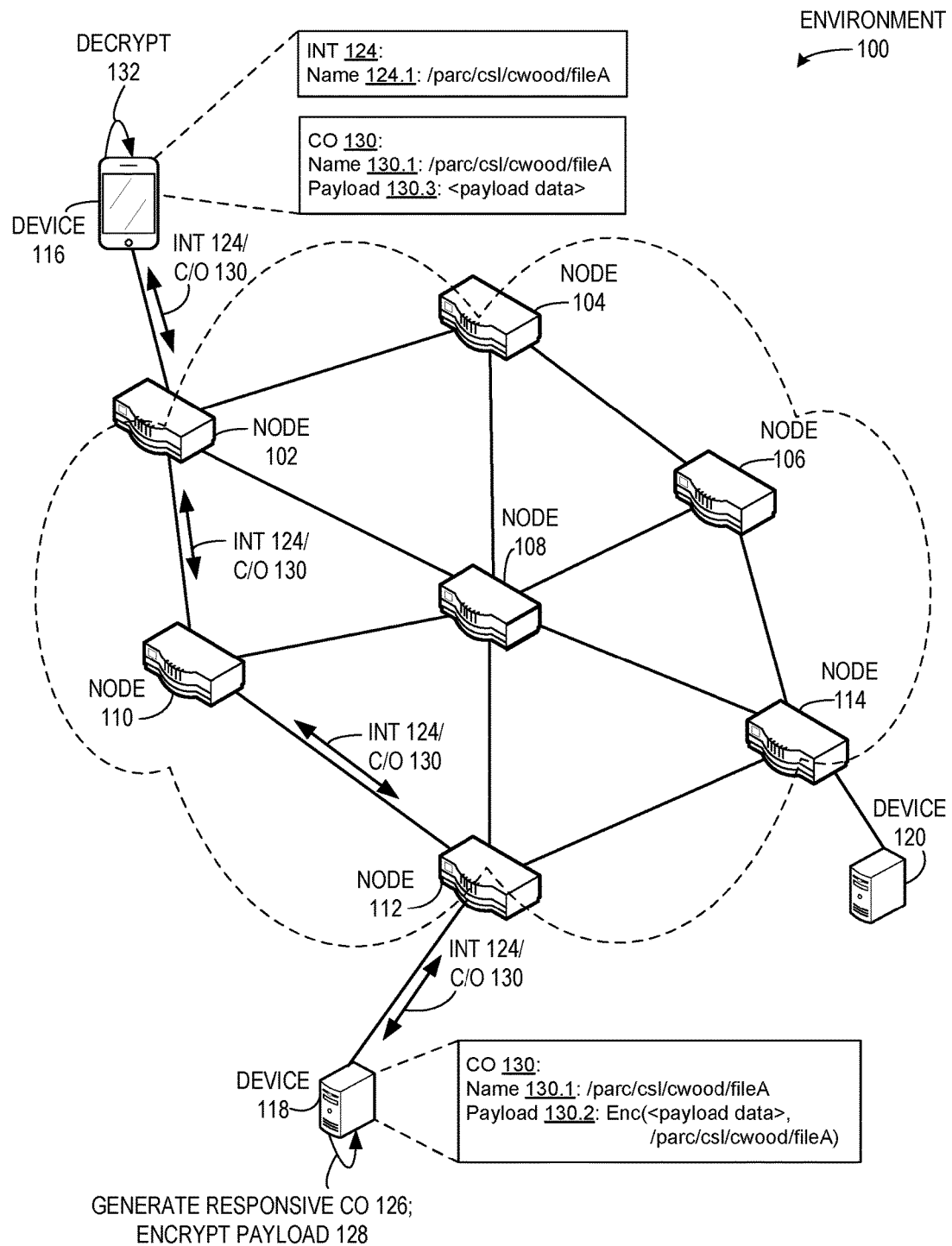
FIG. 1 illustrates an exemplary environment which facilitates schematized access control in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that allows a producer to establish schematized access control to content based only on a name for the content. The system allows the producer to forgo verifying the identity and the authority of a requesting consumer or user, which can result in a more efficient data exchange.

In a traditional hybrid encryption scheme, a producer can encrypt the payload of a content object and only distribute keys to authorized consumers. For example, the producer can generate a random symmetric nonce key "k" for a content object "C," encrypt the payload of C using k, and publish the encrypted content object C. The producer can also encrypt k under another key (so that only authorized users can perform decryption), and publish the encrypted nonce key. A consumer can request the content object C and the corresponding nonce key k, both of which are encrypted. The consumer may request or obtain additional information needed to decrypt the encrypted nonce key, based on the specific access control scheme. The consumer can then decrypt the encrypted nonce key using his private credentials (e.g., the additional information), and subsequently decrypt the encrypted payload of content object C using the decrypted nonce key. In such a hybrid encryption scheme, the producer must maintain the content object C (in both plaintext and encrypted form), the nonce key k in plaintext, and the nonce key k in encrypted form for each different access control group allowed to access the content object C. Additionally, the producer must also maintain authorization information that indicates which access control groups are permitted to access which content objects. This may lead to inefficiencies in the system.

In embodiments of the present invention, the producer need only maintain the content object C and the authorization information. The producer performs a setup function that outputs a master secret key and public parameters. The producer then performs a key generation function which generates a secret key for a specific user, based on the master secret key and a schema. A schema is a regular expression which corresponds to one or more names and allows a user access to content associated with the names. The producer can distribute the key to the appropriate user or consumer. Subsequently, that user can transmit an interest with a name that matches the schema. Upon receiving the interest, the producer can encrypt the payload of the responsive content object based on only the public parameters and the interest name (e.g., the content name). The consumer can subsequently decrypt the encrypted payload of the responsive content object based on the previously distributed (and received) secret key for that consumer. If the name of the encrypted content object corresponds to (or matches) the schema associated with the user's key, then the consumer can successfully decrypt the content object. Otherwise, decryption is unsuccessful.

Thus, embodiments of the present invention allow a producer to define access schemas based on content names, associate the schemas with users, provide secret keys for users based on the schemas, and subsequently encrypt content using only the names of the content objects, without needing to generate and maintain random nonce keys for each content object, and without needing to verify any information relating to the user or consumer. Alternatively, the system can delegate either the encryption or the key generation/distribution to a trusted third party, as described below in relation to FIG. 5. Hence, embodiments of the present invention may result in increased efficiency in a network, specifically, in the communications or exchange of data between a consumer and a producer.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

Sample Algorithms for Schematized Encryption

Embodiments of the present invention use a form of functional encryption based on the below sample algorithms, described in Brent Waters, "Functional encryption for regular languages," Advances in Cryptology-CRYPTO 2012, pages 218-235, Spring 2012 (hereinafter "Waters"). Below is a set of exemplary algorithms used in such a functional cryptosystem:

Setup($1^n,\Sigma$):    Algorithm (1)

Input the security parameter $1^n$ and an alphabet $\Sigma$ limiting the set of schema regular expression symbols.
Output the public parameters ("PP") and the master secret key ("MSK")

Encrypt(PP, w, m):    Algorithm (2)

Input the public parameters PP, a string w that matches or corresponds to the schema (e.g., an interest name that matches a regular expression corresponding to the schema), and a content payload m.
Output the ciphertext "CT," which is the payload m encrypted based on PP and w.

KeyGen(MSK, schema):    Algorithm (3)

Input the master secret key MSK and the schema.
Output a secret key "SK" that can be used to decrypt messages encrypted for the given schema. Note that two keys for the same schema will result in two different secret keys, i.e., there is randomness in each key.

Decryption(SK, CT):    Algorithm (4)

Input the secret key SK and the ciphertext CT.
Output the decrypted payload m if and only if the string w associated with CT is accepted by a deterministic finite automata ("DFA") for the schema. Else, return an error message.

Exemplary Network and Communication

FIG. 1 illustrates an exemplary environment 100 which facilitates schematized access control in a content centric network, in accordance with an embodiment of the present invention. A network 100 can include a consumer or content requesting device 116, producers or content producing devices 118 and 120, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network.

Producer or content producing device 118 can perform setup and key generation procedures based on schemas for content object names. A schema can be a regular expression which corresponds to one or more names. The schema allows a user access to content associated with the names. For example, producer 118 can distribute a key "SK" to client computing device 116 (or a user of device 116) for a schema that is the following regular expression: "/parc/[csl|hsl|ssl]/\\w+." A string, such as an interest name, that matches or corresponds to this regular expression can be: "/parc/csl/cwood/fileA." Other examples of schemas include the following regular expressions: "/parc/csl/cwood/fileA"; and "/parc/csl." Note that the above string can also match or correspond to both of these schemas.

During operation, client device 116 can generate an interest 124 with a name 124.1 of "/parc/csl/cwood/fileA." Interest 124 can travel through network 100 via nodes 102, 110, and 112, before reaching producer 118. Producer 118 can generate a responsive content object 130 (function 126), with a name 130.1 of "/parc/csl/cwood/fileA" and an unencrypted payload 130.2 of "<payload data>." Producer 118 can encrypt payload 130.2 of content object 130 based on interest name 124.1 (i.e., "/parc/csl/cwood/fileA") (function 128), and transmit content object 130 to device 116 on a reverse path (e.g., via nodes 112, 110, and 102).

Client device 116 can receive content object 130 and decrypt the encrypted payload 130.2 based on its secret key SK (function 132) to obtain the unencrypted payload 130.3 of "<payload data>." Exemplary setup, key generation, encryption, and decryption algorithms are described in detail above, and below in relation to FIGS. 2A and 2B.

Embodiments of the present invention allow a producer to directly encrypt a responsive content object based on an incoming interest name, without needing to check the identity of the requesting client or verify the authority of the requesting client. Thus, a producer in the system need only maintain the unencrypted content object and authorization information that indicates which access control groups are permitted to access the content object (by name). Unlike in a hybrid encryption scheme (as described above), the producer does not need to maintain the encrypted content object or a specific key for each access control group permitted to access the content object (in either plaintext or encrypted form). This results in a more efficient network for access to and distribution of data over a network.

Exemplary Communication between a Client Device and a Producer

Figure 2A:
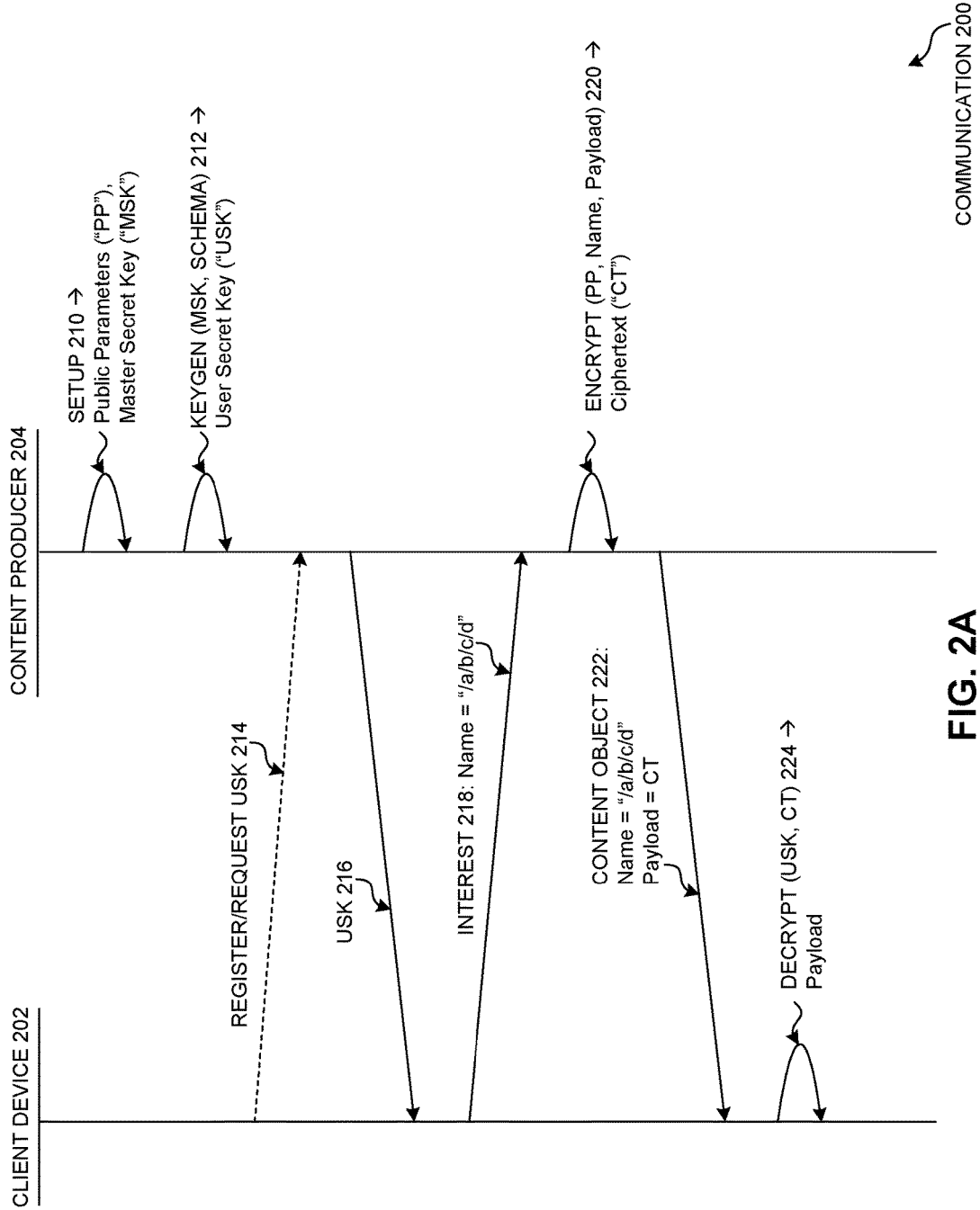
FIG. 2A illustrates an exemplary communication which facilitates schematized access control in a content centric network, including communication between a client device and a content producer, in accordance with an embodiment of the present invention.

FIG. 2A illustrates an exemplary communication 200 which facilitates schematized access control in a content centric network, including communication between a client device 202 and a content producer 204, in accordance with an embodiment of the present invention. Communication 200 is based on the exemplary functional encryption algorithms described above.

Producer 204 can perform a Setup 210 procedure, which outputs public parameters ("PP") and a master secret key ("MSK"). For example producer 204 can run Setup (1", Σ={a-b, A-Z,0-9}), where the alphabet Σ limits the set of schema regular expression symbols. Producer 204 can perform a KeyGen 212 procedure, which takes as input the MSK and a "SCHEMA," and outputs a user secret key ("USK"). The SCHEMA can be a regular expression which accepts (i.e., corresponds to) one or more names, such as "/a/b/c/\\w+." Client device 202 can send, and producer 204 can receive, a register/request 214 for the USK. Producer 204 can transmit USK 216 to client device 202. In some embodiments, client device 202 does not request the USK; instead, producer 204 can distribute the USK as part of a key exchange protocol during setup or initialization.

Subsequently, client device 202 can transmit an interest 218 to producer 204. Interest 218 has a name of "/a/b/c/d." Producer 204 can receive interest 218, and perform an encrypt 220 procedure, which takes as input the PP, a string (in this case the interest name of "/a/b/c/d") that corresponds to the schema, and the unencrypted payload of a responsive content object. The encrypt 220 procedure outputs the ciphertext ("CT"), which is the payload encrypted based on the PP and the interest name. Producer 204 can transmit a responsive content object 222 with a name of "/a/b/c/d" and a payload of "CT" to client device 202. Upon receiving content object 222 with the encrypted payload CT, client device 202 can perform a decrypt 224 procedure, which takes as input the USK and the CT, and outputs the unencrypted payload of the responsive content object. As described above, the decrypt 224 procedure returns a successful result (i.e., the unencrypted payload) if and only if the string associated with the CT is accepted by a deterministic finite automata ("DFA") for the schema, as described in Waters.

Exemplary Communication with Delegated Key Generation

The encryption and key generation procedures or functionalities may run in separate (disjoint) applications for security reasons. Note that the KeyGen procedure is the only procedure that requires the MSK to operation. Thus, producer 204 can delegate the storage and invocation of the KeyGen procedure to a trusted third party, such as a key managing device. For example, in a DRM system, permissions to access individual content objects (e.g., media files) may be managed by a third party (e.g., the music or content provider). A streaming service may subsequently distribute encrypted media objects to a consumer on behalf of the third party (e.g., the content provider).

Figure 2B:
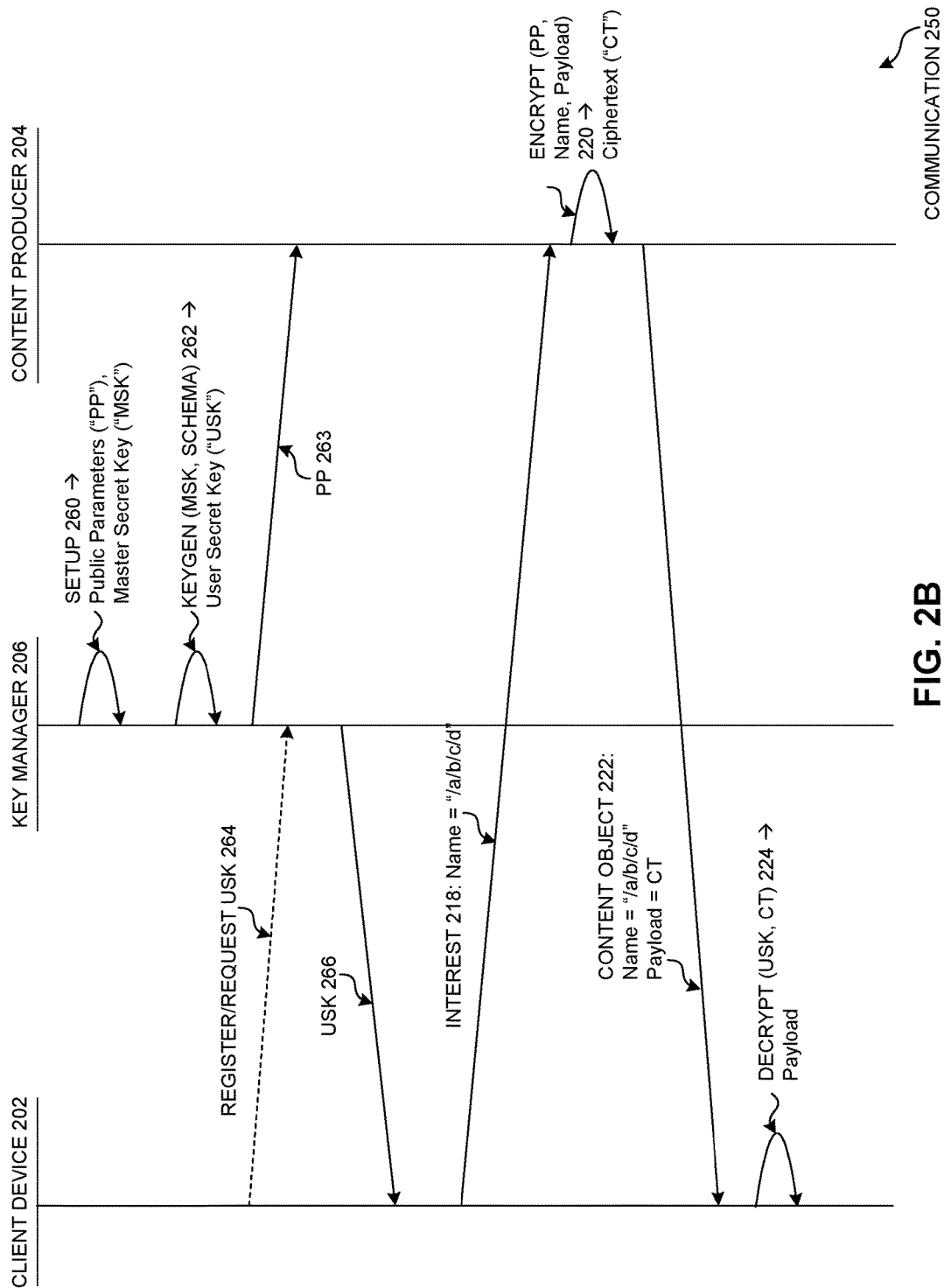
FIG. 2B illustrates an exemplary communication which facilitates schematized access control in a content centric network, including communication between a client device, a key manager, and a content producer, in accordance with an embodiment of the present invention.

FIG. 2B illustrates an exemplary communication 250 which facilitates schematized access control in a content centric network, including communication between client device 202, a key manager 206, and content producer 204, in accordance with an embodiment of the present invention. Key manager 206 can perform a Setup 260 procedure, which outputs public parameters ("PP") and a master secret key ("MSK"). Key manager 206 can perform a KeyGen 262 procedure, which takes as input the MSK and a "SCHEMA," and outputs a user secret key ("USK"). Client device 202 can send, and key manager 206 can receive, a register/request 264 for the USK. Key manager 206 can transmit USK 266 to client device 202. In some embodiments, client device 202 does not request the USK; instead, key manager 206 can distribute the USK as part of a key exchange protocol during setup or initialization. In addition, key manager 206 can transmit PP 263 to producer 204.

The remaining communications (e.g., 218 and 222) and procedures (e.g., 220 and 224) shown in FIG. 2B are similar to the corresponding communications shown in FIG. 2A. That is, client device 202 transmits interest 218 to content producer 204, and content producer 204 encrypts a responsive content object 222 based on the interest name and the PP (received in PP 263). Content producer 204 transmits content object 222 with the encrypted payload to client device 202. Client device 202 decrypts the encrypted payload based on its USK (received in USK 266) to obtain the unencrypted payload of the responsive content object.

Content Producing Device Facilitates Schematized Access Control

Figure 3:
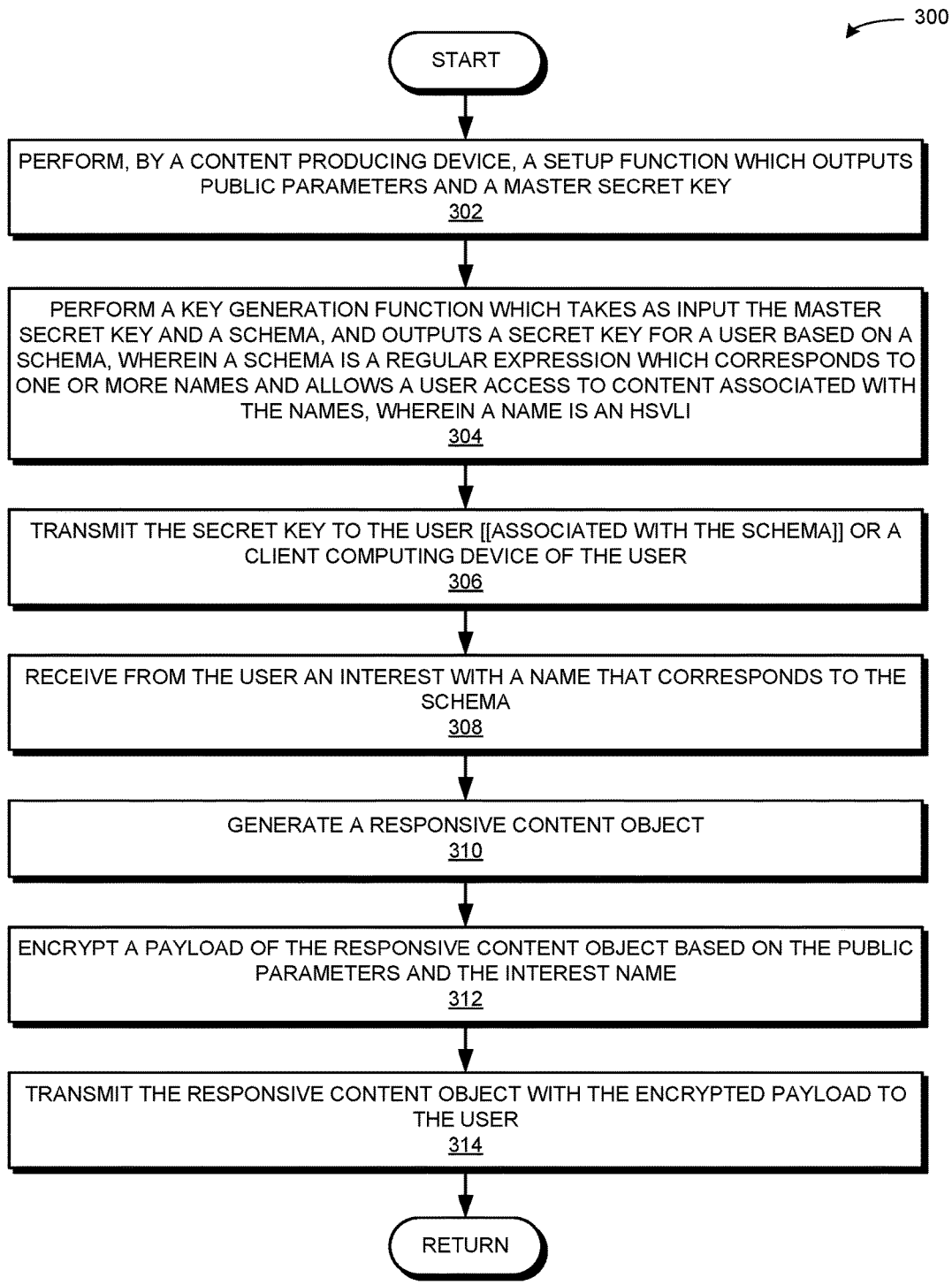
FIG. 3 presents a flow chart illustrating a method by a client computing device for facilitating schematized access control in a content centric network, in accordance with an embodiment of the present invention.

FIG. 3 presents a flow chart 300 illustrating a method by a client computing device for facilitating schematized access control in a content centric network, in accordance with an embodiment of the present invention. During operation, the system performs, by a content producing device, a setup function which outputs public parameters and a master secret key (operation 302). The system performs a key generation function which takes as input the master secret key and a schema, and outputs a secret key for a user based on a schema (operation 304). A schema is a regular expression which corresponds to one or more names and allows a user access to content associated with the names, and a name is an HSVLI. The system transmits the secret key to the user or a client computing device of the user (operation 306). Subsequently, the system receives from the user an interest with a name that corresponds to the schema (operation 308). The system generates a responsive content object (operation 310) and encrypts a payload of the responsive content object based on the public parameters and the interest name (operation 312). The system transmits the responsive content object with the encrypted payload to the user (operation 314).

Client Computing Device Facilitates Schematized Access Control

Figure 4:
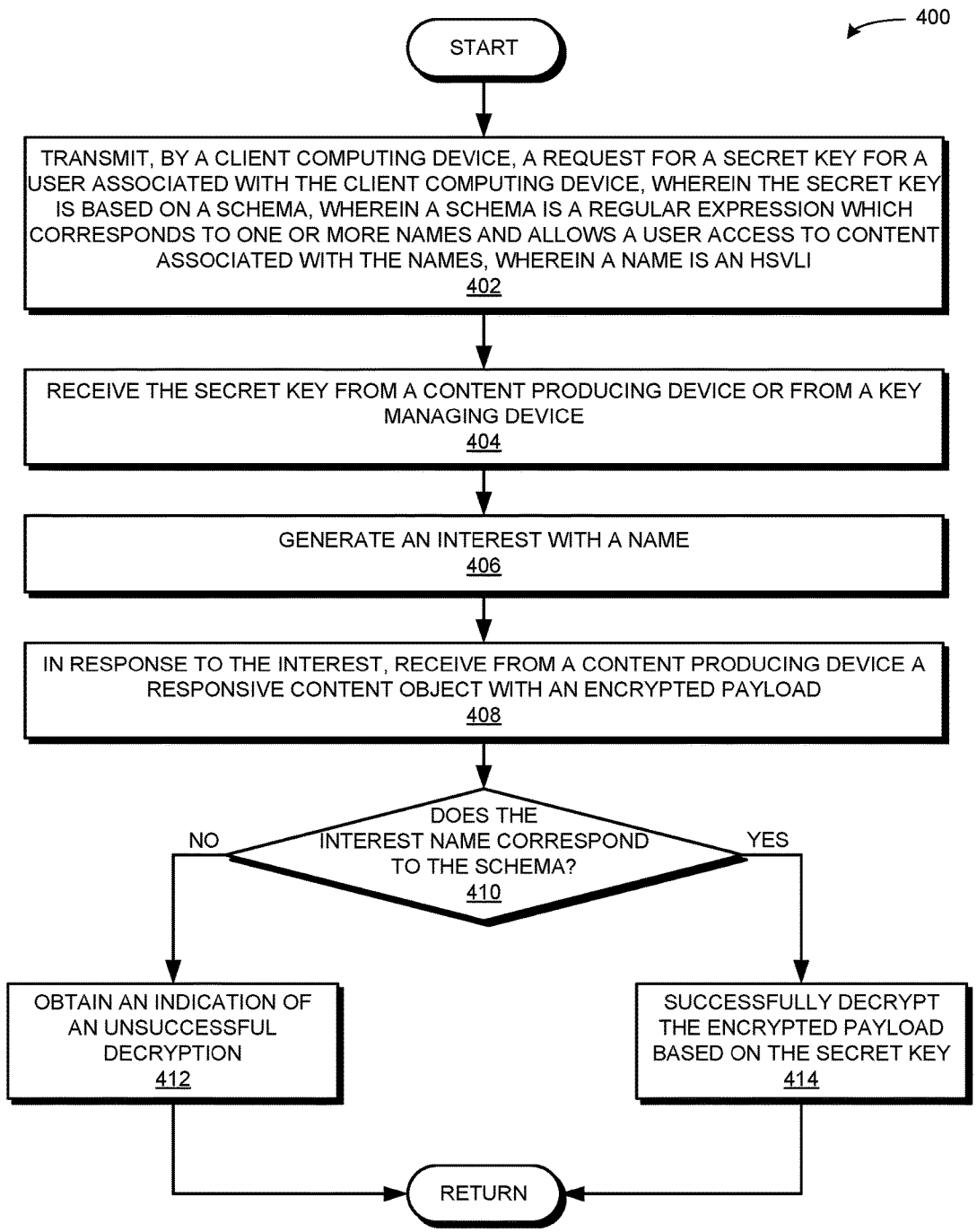
FIG. 4 presents a flow chart illustrating a method by a client computing device for facilitating schematized access control in a content centric network, in accordance with an embodiment of the present invention.

FIG. 4 presents a flow chart 400 illustrating a method by a client computing device for facilitating schematized access control in a content centric network, in accordance with an embodiment of the present invention. During operation, the system transmits, by a client computing device, a request for a secret key for a user associated with the client computing device, where the secret key is based on a schema (operation 402). A schema is a regular expression which corresponds to one or more names and allows a user access to content associated with the names, and a name is an HSVLI. The system receives the secret key from a content producing device or from a key managing device (operation 404). In some embodiments, the system does not transmit a request for the secret key. Instead, the content producing device or the key managing device distributes the secret key as part of a key exchange protocol.

Subsequently, the system generates an interest with a name (operation 406). In response to the interest, the system receives from a content producing device a responsive content object with an encrypted payload (operation 408). The system determines whether the interest name corresponds to the schema (decision 410). If it does not, the system cannot decrypt the encrypted payload. The system can obtain an indication of an unsuccessful decryption, such as a "cannot decrypt" or other similar error message (operation 412). If the interest name does correspond to the schema, the system successfully decrypts the encrypted payload based on the secret key (operation 414).

Key Managing Device Facilitates Schematized Access Control

Figure 5:
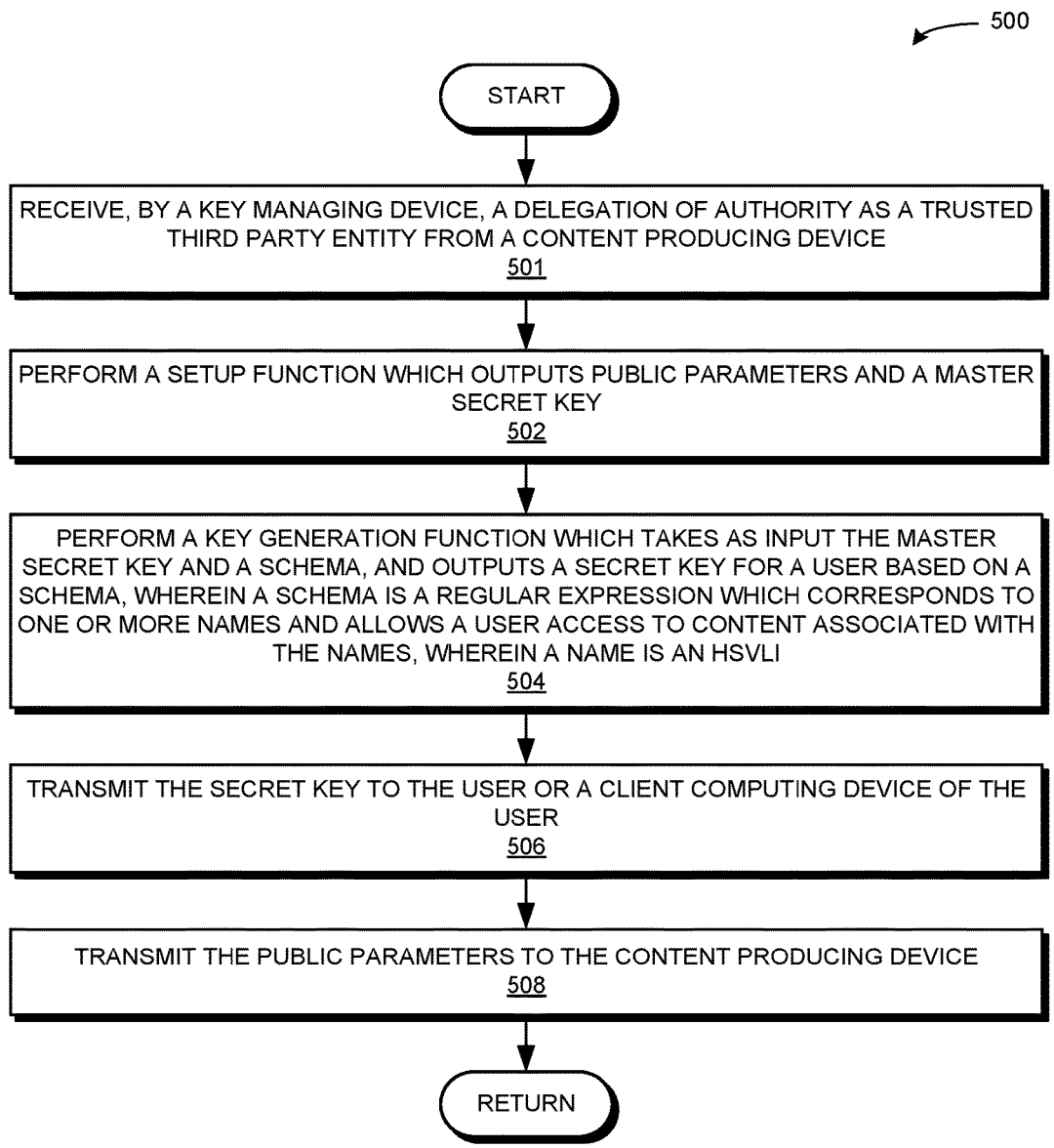
FIG. 5 presents a flow chart illustrating a method by a key managing device for facilitating schematized access control in a content centric network, in accordance with an embodiment of the present invention.

FIG. 5 presents a flow chart 500 illustrating a method by a key managing device for facilitating schematized access control in a content centric network, in accordance with an embodiment of the present invention. During operation, the system receives, by a key managing device, a delegation of authority as a trusted third party entity from a content producing device (operation 501). The system performs a setup function which outputs public parameters and a master secret key (operation 502). The system performs a key generation function which takes as input the master secret key and a schema, and outputs a secret key for a user based on a schema (operation 504). A schema is a regular expression which corresponds to one or more names and allows a user access to content associated with the names, where a name is an HSVLI. The system transmits the secret key to the user or a client computing device of the user (operation 506). The system also transmits the public parameters to the content producing device (operation 508).

Exemplary Computer System

Figure 6:
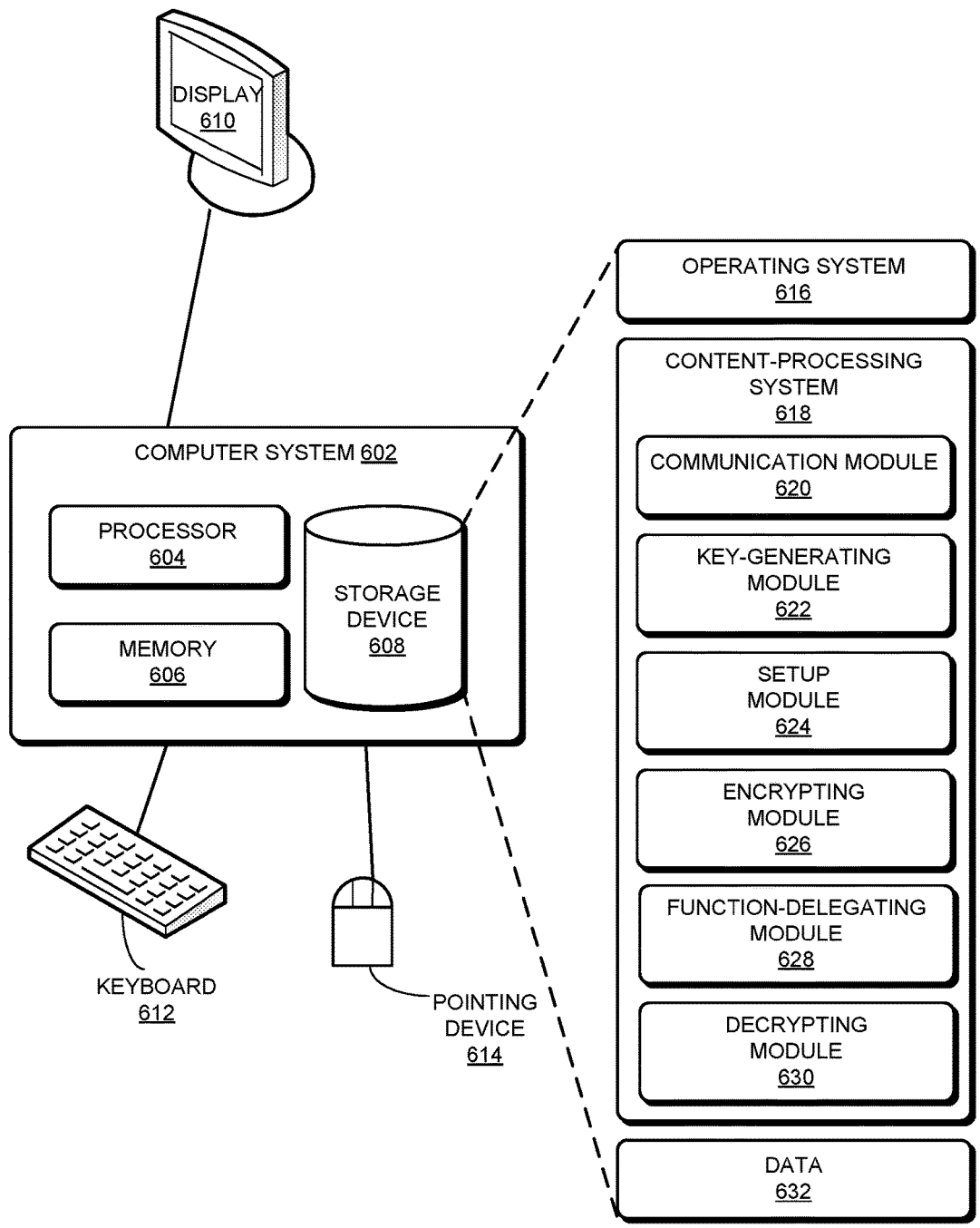
FIG. 6 illustrates an exemplary computer system that facilitates schematized access control in a content centric network, in accordance with an embodiment of the present invention.

FIG. 6 illustrates an exemplary computer system 600 that facilitates routable prefix queries in a content centric network, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 632.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, such as a content centric network (communication module 620). A data packet can include a key or public parameters. A data packet can also include an interest packet or a content object packet with a name which is an HSVLI that includes contiguous name components ordered from a most general level to a most specific level.

Further, content-processing system 618 can include instructions for generating, by a content producing device, a secret key for a user based on a schema and a master secret key (key-generating module 622). Content-processing system 618 can include instructions for receiving an interest with a name that corresponds to the schema (communication module 620), encrypting a payload of a responsive content object based on the interest name and public parameters (encrypting module 626), and transmitting the responsive content object with the encrypted payload to the user (communication module 620). Content-processing system 618 can also include instructions for performing a setup function which outputs the master secret key and the public parameters (setup module 624), Content-processing system 618 can further include instructions for transmitting the secret key to the user or a client computing device of the user (communication module 620). Content-processing system 618 can include instructions for generating the secret key in response to one or more of the following: adding a new user to the system; changing a permission of a current user of the system; and determining a need to change the secret key, including a need to rotate one or more secret keys of current users of the system (key-generating module 622). Content-processing system 618 can also include instructions for delegating the generation of the secret key and the performance of the setup function to a trusted third party that is a key managing device (function delegating module 628).

Content-processing system 618 can additionally include instructions for receiving, by a client computing device, a secret key for a user based on a schema (communication module 620). Content-processing system 618 can include instructions for, in response to an interest with a name, receiving from a content producing device a responsive content object with an encrypted payload (communication module 620). Content-processing system 618 can include instructions for, in response to determining that the interest name corresponds to the schema, decrypting the payload based on the secret key (decrypting module 630).

Content-processing system 618 can also include instructions for, in response to determining that the interest name does not correspond to the schema, obtaining an indication that the decryption is unsuccessful (decrypting module 630). Content-processing system 618 can include instructions for receiving the secret key in response to transmitting a request for the secret key (communication module 620).

Content-processing system 618 can further include instructions for transmitting the request for the secret key to a key managing device that is a trusted third party of the content producing device, wherein the content producing device delegates generation of the secret key and performance of a setup function to the key managing device (communication module 620). Content-processing system 618 can include instructions for receiving the secret key from the key managing device (communication module 620). Content-processing system 618 can also include instructions for transmitting the request for the secret key to the content producing device, and receiving the secret key from the content producing device (communication module 620).

Data 632 can include any data that is required as input or that is generated as output by the methods and/or processes described in this disclosure. Specifically, data 632 can store at least: an interest; a content object; a name for an interest or a content object; a name that is an HSVLI; a key; a schema that is a regular expression which corresponds to one or more names and allows a user access to content associated with the names; a payload of a content object; an encrypted payload; a master secret key; public parameters; information related to a user of a system or device; functions for setup, key generation, encryption, and decryption; functions that are based on a functional encryption system; and an indication of a delegation of authority to a trusted third party for a function.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating schematized access control to content objects in a content centric network, the computer system comprising:
    a processor; and
    a storage device storing instructions that when executed by the processor cause the processor to perform a method, the method comprising:
    performing a setup function which outputs a master secret key associated with a content producing device and public parameters, and limits a set of schema regular expression symbols for a schema based on an alphabet and that is associated with a user;
    generating, by the content producing device, a secret key for the user in the content centric network based on (i) the master secret key associated with the content producing device, and (ii) the schema associated with the user, wherein the schema is a regular expression which corresponds to one or more names associated with content objects and allows the user access to the content objects associated with the one or more names, wherein a name is a hierarchically structured variable length identifier that includes contiguous name components ordered from a most general level to a most specific level and which uniquely identifies a specific content object, wherein the generating is performed in response to each of adding the user in the content centric network, changing a permission of the user, and determining a need to rotate one or more secret keys of the user;
    receiving an interest from the user that includes a name that matches the schema associated with the user;
    in response to receiving the interest from the user, encrypting a payload of a responsive content object that is unencrypted at the content producing device until the encrypting based on (i) the name included in the interest that matches the schema associated with the user, and (ii) the public parameters; and
    transmitting the responsive content object with the encrypted payload to the user, wherein the encrypted payload is configured such that it can only be decrypted by the secret key of the user and wherein the encrypted payload is configured such that it cannot be decrypted by the user if the name included in the interest does not match the schema associated with the user, thereby facilitating schematized access control to content objects in the content centric network.

2. The computer system of claim 1, wherein the instructions cause the processor to further perform the method comprising:
    receiving a request from the user; and
    in response to the request, transmitting the secret key and the public parameters to the user or a client computing device of the user to enable the client computing device to decrypt the encrypted payload.

3. The computer system of claim 1, wherein the instructions cause the processor to further perform the method comprising:
    generating the responsive content object with the encrypted payload.

4. The computer system of claim 1, wherein performing the setup function, generating the secret key, and encrypting the payload of the responsive content object are based on a functional encryption system.

5. The computer system of claim 1, wherein the instructions cause the processor to further perform the method comprising:
    delegating the generating of the secret key and the performing of the setup function to a trusted third party that is a key managing device,
    wherein the key managing device:
        performs the setup function which outputs the master secret key and the public parameters;
        generates the secret key for the user based on the schema;
        transmits the secret key to the user or a client computing device of the user; and transmits the public parameters to the content producing device.

6. The computer system of claim 1, wherein the instructions cause the processor to further perform:
defining the schema based on the name and associating the schema with the user.

7. The computer system of claim 1, wherein the responsive content object includes the name included in the interest.

8. A computer-implemented method for facilitating schematized access control to content objects in a content centric network, the computer-implemented method comprising:
performing a setup function which outputs a master secret key associated with a content producing device and public parameters, and limits a set of schema regular expression symbols for a schema based on an alphabet and that is associated with a user;
generating, by the content producing device, a secret key for the user in the content centric network based on (i) the master secret key associated with the content producing device, and (ii) the schema associated with the user, wherein the schema is a regular expression which corresponds to one or more names associated with content objects and allows the user access to the content objects associated with the one or more names, wherein a name is a hierarchically structured variable length identifier that includes contiguous name components ordered from a most general level to a most specific level and which uniquely identifies a specific content object, wherein the generating is performed in response to each of adding the user in the content centric network, changing a permission of the user, and determining a need to rotate one or more secret keys of the user;
receiving an interest from the user that includes a name that matches the schema associated with the user;
in response to receiving the interest from the user, encrypting a payload of a responsive content object that is unencrypted at the content producing device until the encrypting based on (i) the name included in the interest that matches the schema associated with the user, and (ii) the public parameters; and
transmitting the responsive content object with the encrypted payload to the user, wherein the encrypted payload is configured such that it can only be decrypted by the secret key of the user and wherein the encrypted payload is configured such that it cannot be decrypted by the user if the name included in the interest does not match the schema associated with the user, thereby facilitating schematized access control to content objects in the content centric network.

9. The computer-implemented method of claim 8, further comprising:
receiving a request from the user; and
in response to the request, transmitting the secret key and the public parameters to the user or a client computing device of the user to enable the client computing device to decrypt the encrypted payload.

10. The computer-implemented method of claim 8, further comprising:
generating the responsive content object with the encrypted payload.

11. The computer-implemented method of claim 8, wherein performing the setup function, generating the secret key, and encrypting the payload of the responsive content object are based on a functional encryption system.

12. The computer-implemented method of claim 8, further comprising:
delegating the generating of the secret key and the performing of the setup function to a trusted third party that is a key managing device,
wherein the key managing device:
performs the setup function which outputs the master secret key and the public parameters;
generates the secret key for the user based on the schema;
transmits the secret key to the user or a client computing device of the user; and
transmits the public parameters to the content producing device.

13. The computer-implemented method of claim 8, further comprising:
defining the schema based on the name and associating the schema with the user.

14. The computer-implemented method of claim 8, wherein the responsive content object includes the name included in the interest.

15. A non-transitory computer readable medium encoded with instructions that, when executed by a processor of a computer system for facilitating schematized access control to content objects in a content centric network, cause the processor to perform:
performing a setup function which outputs a master secret key associated with a content producing device and public parameters, and limits a set of schema regular expression symbols for a schema based on an alphabet and that is associated with a user;
generating, by the content producing device, a secret key for the user in the content centric network based on (i) the master secret key associated with the content producing device, and (ii) the schema associated with the user, wherein the schema is a regular expression which corresponds to one or more names associated with content objects and allows the user access to the content objects associated with the one or more names, wherein a name is a hierarchically structured variable length identifier that includes contiguous name components ordered from a most general level to a most specific level and which uniquely identifies a specific content object, wherein the generating is performed in response to each of adding the user to the computer system, changing a permission of the user, and determining a need to rotate one or more secret keys of the user;
receiving an interest from the user that includes a name that matches the schema associated with the user;
in response to receiving the interest from the user, encrypting a payload of a responsive content object that is unencrypted at the content producing device until the encrypting based on (i) the name included in the interest that matches the schema associated with the user, and (ii) the public parameters; and
transmitting the responsive content object with the encrypted payload to the user, wherein the encrypted payload is configured such that it can only be decrypted by the secret key of the user and wherein the encrypted payload is configured such that it cannot be decrypted by the user if the name included in the interest does not match the schema associated with the user, thereby facilitating schematized access control to content objects in the content centric network.

16. The non-transitory computer readable medium of claim 15, wherein the instructions cause the processor to further perform:
receiving a request from the user; and
in response to the request, transmitting the secret key and the public parameters to the user or a client computing device of the user to enable the client computer device to decrypt the encrypted payload.

17. The non-transitory computer readable medium of claim 15, wherein the instructions cause the processor to further perform:
generating the responsive content object with the encrypted payload.

18. The non-transitory computer readable medium system of claim 15, wherein performing the setup function, generating the secret key, and encrypting the payload of the responsive content object are based on a functional encryption system.

19. The non-transitory computer readable medium of claim 15, wherein the instructions cause the processor to further perform:
delegating the generating of the secret key and the performing of the setup function to a trusted third party that is a key managing device,
wherein the key managing device:
performs the setup function which outputs the master secret key and the public parameters;
generates the secret key for the user based on the schema;
transmits the secret key to the user or a client computing device of the user; and
transmits the public parameters to the content producing device.

20. The non-transitory computer readable medium of claim 15, wherein the instructions cause the processor to further perform:
defining the schema based on the name and associating the schema with the user.

* * * * *